UNITED STATES PATENT OFFICE.

GEORGE HAND SMITH, OF NEW YORK, N. Y.

IMPROVED CEMENT FOR PAVEMENTS, WALKS, ROOFS, &c.

Specification forming part of Letters Patent No. 103,095, dated May 17, 1870; antedated May 4, 1870.

*To all whom it may concern:*

Be it known that I, GEORGE HAND SMITH, of the city, county, and State of New York, have invented a new and Improved Mode of Preparing Cement, which I have named "Dura" cement, for the purpose of making pavements and walks, the coverings of roofs, lining cisterns, &c., molding into architectural ornaments, &c.; and I do declare that the following is a full and exact description thereof.

The nature of my invention consists in the combination of pine-tar, magnesia, lime, pulverized calcined alumina or fire-clay, and a fixed or non-volatile oil, in definite proportions, to produce the desired result.

The basis of this cement is pine-tar. The first object to be attained in its composition is to neutralize the acids contained therein and to drive off the more volatile elements, which tend ultimately to induce disintegration, not to thicken the tar by adding foreign matter mechanically, as is generally done in other cements. This decomposition is effected by adding a small percentage of alkali, as potash, soda, lime, magnesia, or their equivalent combinations, although the last two—calcined carbonate of lime and magnesia—are preferred, the object being to make a cement that will not grow resinous, and thus brittle, but that shall remain tough as well as hard. The volatile elements, being removed as described, are partly replaced by adding a small portion of a non-volatile oil, of which linseed-oil is preferred.

The last step consists in adding a powerful absorbent that shall fix or hold the oil added and the remaining liquid elements in the tar, to give that degree of softness, with the desired hardness, without its becoming resinous or brittle. This inclosing in the cement of the oily and other liquid elements insures the perpetual toughness required—the great feature of this cement. For this purpose alumina is employed. The form I have found the best is calcined fire-clay pulverized, the effect of which is instantaneous, at once taking up the fluid portion of the tar, toughening it, and requiring a very considerable increase of heat to render the mixture fluid—a very important property, as protecting the cement from softening by the rays of the sun.

On cooling, the cement hardens at once to the point desired—a very valuable property in molding, pavements, &c. It can be made with the greatest exactness, as soft or as hard as desired, and yet, when hard, possessing the most remarkable strength and adhesive properties.

In the place of the alkalies lime and magnesia, the calcined magnesia-limestone can be employed with fair results if very pure and of the finest quality.

In the use of alumina or its equivalent compounds, I do not confine myself to calcined clay; but other forms of clay or sulphate of alumina—gypsum—might be substituted; but the fire-clay is preferred.

Other fixed or non-volatile oils may be employed, although I prefer linseed-oil.

The proportions of this cement are as follows:

No. 1—Hard.

Pine-tar, one part; lime, two-sevenths of a part; magnesia, two-ninths of a part; linseed-oil, one-twentieth of a part; calcined kaolin or fire-clay, three-fourths of a part.

No. 2—Soft.

Pine-tar, one part; lime, one-seventh of a part; magnesia, one-ninth of a part; linseed-oil, one-twentieth of a part; calcined kaolin or fire-clay, one-half of a part.

The method of preparing this cement is as follows:

First, a given measured amount of commercial pine-tar is put into a deep iron kettle and the proper proportion of alkali added to it. Heat is applied to a point just below the boiling-point of the tar, when a sudden and very active ebullition takes place for a few minutes, neutralizing the acids and driving off the volatile elements, which, soon ceasing, leaves the mixture quite thin and ready for the next step.

Second, the same degree of heat being continued, a proper proportion of linseed-oil is added.

Third, the absorbent alumina or clay is added, the heat is increased, and the mixture kept stirred until the alumina is equally distributed. The cement is then complete in its preparation and ready for use.

Claim.

What I claim as my invention, and desire to secure by Letters Patent, is—

The combination, with pine-tar, of an alkali or alkalies, or their equivalent compounds, with a fixed or non-volatile oil and calcined alumina or its compounds, for the production of a cement by the method and for the uses above described.

GEORGE HAND SMITH.

Witnesses:
SAML. STEVENS,
EDMUND POPE, Jr.